United States Patent [19]

Kilpatrick

[11] Patent Number: 4,526,328
[45] Date of Patent: Jul. 2, 1985

[54] EMERGENCY LOCKING REEL FOR BELTS

[75] Inventor: Ewen P. Kilpatrick, Eltham, Australia

[73] Assignee: Repco Limited, Melbourne, Australia

[21] Appl. No.: 486,435

[22] Filed: Apr. 19, 1983

[30] Foreign Application Priority Data

May 4, 1982 [AU] Australia .................................. 3848
Dec. 9, 1982 [AU] Australia .................................. 7203

[51] Int. Cl.³ ........................ A62B 35/02; B65H 75/48
[52] U.S. Cl. ........................ 242/107.4 A; 242/107.4 B
[58] Field of Search ............... 242/107.4 B, 107.4 A; 280/806; 297/478, 480

[56] References Cited

U.S. PATENT DOCUMENTS

| 3,552,676 | 1/1971 | Weber | 242/107.4 BX |
|---|---|---|---|
| 4,065,071 | 12/1977 | Holmberg | 242/107.4 BX |
| 4,087,059 | 5/1978 | Lindblad | 242/107.4 A |
| 4,168,810 | 9/1979 | Sack et al. | 242/107.4 A |
| 4,228,970 | 10/1980 | Morinaga | 242/107.4 BX |
| 4,300,733 | 11/1981 | Morinaga | 242/107.4 A |
| 4,369,932 | 1/1983 | Seifert et al. | 242/107.4 A |

FOREIGN PATENT DOCUMENTS

2620421 11/1977 Fed. Rep. of Germany ... 242/107.4 A
2817214 10/1979 Fed. Rep. of Germany .
2090119 7/1982 United Kingdom .

Primary Examiner—John M. Jillions
Attorney, Agent, or Firm—Stevens, Davis, Miller & Mosher

[57] ABSTRACT

An emergency locking reel for a safety belt and being of the kind having a frame which is securable to a support, a spool rotatably mounted on that frame, and locking means operable to prevent rotation of that spool in a belt unwinding direction. The locking means comprises a toothed ring secured to the frame and a pawl rotatable with the spool and movable relative thereto to engage the ring. According to the invention, an inertia plate is provided separate from the pawl and is mounted on the spool spindle for limited relative rotation. A ratchet wheel is connected to the pawl for rotation therewith and carries a detent which responds to relative rotation between the wheel and inertia plate to stop rotation of the wheel and thereby cause the pawl to engage the ring. A spring resists that relative rotation between the wheel and inertia plate. The housing for the locking means is symmetrical about a plane which contains the spindle axis and a sensor responsive to vehicle deceleration is also located on that plane. The sensor is securable to the housing in any of a plurality of positions without disturbing the aforementioned symmetry. Furthermore, each tooth of the locking ring is symmetrical about a plane containing the spindle axis. An end plate of the housing has, as integral parts, a bearing for the spindle and locating means for the locking ring and sensor respectively, thereby simplifying assembly of the reel. A wedge-type retainer secures an end of the belt to the reel by locating in a slot of the spool and clamping the belt in three separate zones.

19 Claims, 21 Drawing Figures

EMERGENCY LOCKING REEL FOR BELTS

This invention relates to emergency locking reels of the inertia type as used in safety belt retractor systems and is particularly but not exclusively concerned with motor vehicle safety belt retractors. It will be convenient to hereinafter describe the invention with particular reference to motor vehicle safety belt retractors, but the invention has other applications.

Emergency locking reels of the aforementioned kind are generally complex in construction and must be manufactured to close tolerances in order to be satisfactory in operation. Both factors add to the cost of such reels. A further disadvantage is that, in many cases, the sensitivity of the automatic reel locking mechanism is affected by the rotational position of the reel spindle upon which the belt is wound. Such variation in sensitivity has adverse consequences on the operation, and consequently the safety potential, of the retractor.

Emergency locking reels of the aforementioned kind are generally constructed so that the locking action can be triggered in either of two ways. If the associated vehicle suddenly deccelerates, a sensor device functions to trigger the locking action. If on the other hand, the reel spindle is suddenly turned in the belt unwinding direction—e.g., by a sudden pulling on the belt—an inertia device functions to trigger the locking action. The inertia device is usually spring influenced into a rest position at which its relationship with other parts of the mechanism is such that it does not function to prevent rotation of the reel spindle. The influence of the spring however, is affected according to the rotational position of the reel spindle and that variation in spring loading causes a variation in the sensitivity of the inertia device to the conditions which trigger the reel locking action.

It is a principal object of the present invention to provide an emergency locking reel of the aforementioned kind in which the sensitivity of the inertia device is substantially unaffected by the rotational position of the reel spindle.

It is a further object of the invention to provide an emergency locking reel in which major components are arranged symmetrical about a plane containing the spindle axis so that the reel can be easily adapted for use with either hand of rotation for belt unwinding.

It is still another object of the invention to provide an emergency locking reel in which the sensor which responds to vehicle deccelaration can be easily secured in any one of a variety of positions selected according to the disposition of the reel when attached to a vehicle.

It is yet another object of the invention to provide an emergency locking reel of simplfied construction and in which critical parts are located in correct relative positions with minimum demand on manufacturing tolerances. That is, the general assembly is rationalized in such a way as to simplify manufacture and thereby reduce costs.

It is still a further object of the invention to provide an emergency locking reel having simplified and secure means for fastening an end of the belt to the rotatable spool on which it is wound.

According to one aspect of the present invention there is provided an emergency locking reel for a safety belt including, a frame, a spindle rotatably mounted on said frame, locking means operable to prevent rotation of said spindle relative to said frame in one direction, a detent connected to said spindle for rotation therewith and being operable to cause operation of said locking means, an inertia plate separate from said locking means and mounted on said spindle for limited rotation relative thereto, said detent being responsive to a change in the relative positions of said detent and said inertia plate so as to be rendered operative by that change, and spring means acting on said inertia plate to resiliently resist said change in relative positions, the arrangement being such that said spring means can be overcome by sudden rotation of said spindle in said one direction to thereby cause said change in relative positions so that said locking means becomes operative to prevent further rotation of the spindle in said one direction.

In an emergency locking reel as described above, the inertia plate has the capacity to move relative to all other components, or at least those components which are critical to the reel locking function. In particular, the inertia member is preferably formed separate from the ratchet wheel which is usually associated with the sensor device in such reels, whereas in prior constructions it was not uncommon for the ratchet wheel to include or comprise the inertia member. It is a further feature of one form of the invention that the inertia member and ratchet wheel are spring biased into a particular relationship in such a way that the spring force acting between the two components is substantially unaffected by the rotational position of the reel spindle.

According to a further aspect of the invention, there is provided an emergency locking reel for a safety belt, including, a frame, a spindle rotatably mounted on said frame, locking means operable to prevent rotation of said spindle relative to said frame in one direction, a locking ring forming part of said locking means and being secured to said frame against relative movement, the opening through said ring being coaxial with said spindle, and a plurality of teeth provided around the periphery of said opening at regularly spaced intervals, each said tooth projecting inwardly towards the axis of said spindle and having a shape which is substantially symmetrical about a plane which contains the spindle axis.

According to yet another aspect of the invention, there is provided an emergency locking reel for a safety belt, including, a frame, a spindle rotatably mounted on said frame, locking means operable to prevent rotation of said spindle relative to said frame in one direction, a housing secured to said frame and containing said locking means, a vehicle deceleration responsive sensor which is operable to cause operation of said locking means and has a part-spherical member, a spherical cavity within said housing which is substantially complementary to the spherical part of said member, said member being securable within said cavity in any one of a range of possible positions relative to said housing, and said position is selected according to the intended disposition of said housing relative to a vehicle to which it is attached in use.

According to still another aspect of the invention, there is provided an emergency locking reel for a safety belt including, a frame, a spindle rotatably mounted on said frame, a locking ring secured to said frame against movement relative thereto, a pawl rotatable with said spindle and being operable to engage said locking ring and thereby prevent rotation of said spindle in one direction relative to said frame, a vehicle deceleration responsive sensor operable to cause operation of said pawl, and an end plate attached to said frame and being moulded from a plastics material, said end plate having as integral parts thereof a bearing for said spindle, locating means to position said locking ring relative to said spindle, and further locating means to position said sensor relative to said spindle.

According to another aspect of the invention, there is provided an emergency locking reel wherein said frame has two spaced end walls, said spindle forms part of a spool which is contained between said end walls and upon which a said belt is wound, a retainer spring is located outside one said side wall and is connected to said spindle to drive said spool in a belt winding direction, said end plate is secured to the outside of the other said side wall so as to be interposed between that side wall and said locking ring, and said locking ring is also secured to said other side wall.

The essential features of the invention, and further optional features, are described in detail in the following passages of the specification which refer to the accompanying drawings. The drawings however, are merely illustrative of how the invention might be put into effect, so that the specific form and arrangement of the features (whether they be essential or optional features) shown is not to be understood as limiting on the invention.

Figure 1:
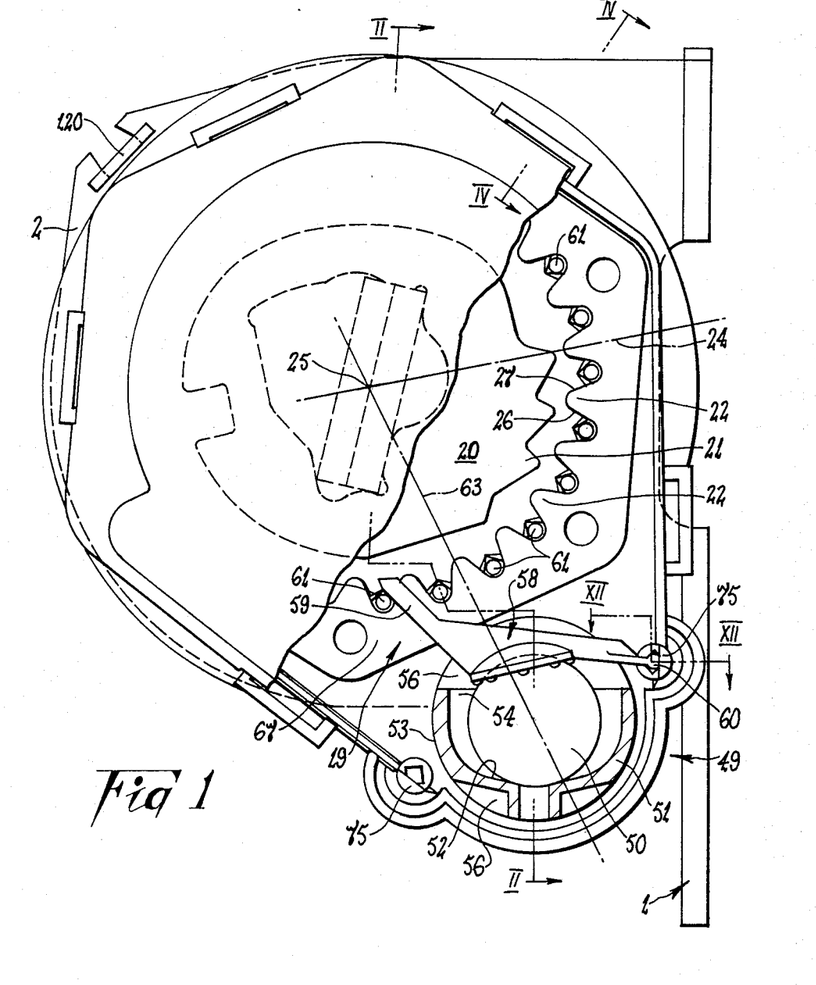
FIG. 1 is a partially sectioned end elevational view of one form of reel assembly incorporating an embodiment of the invention.
Figure 2:
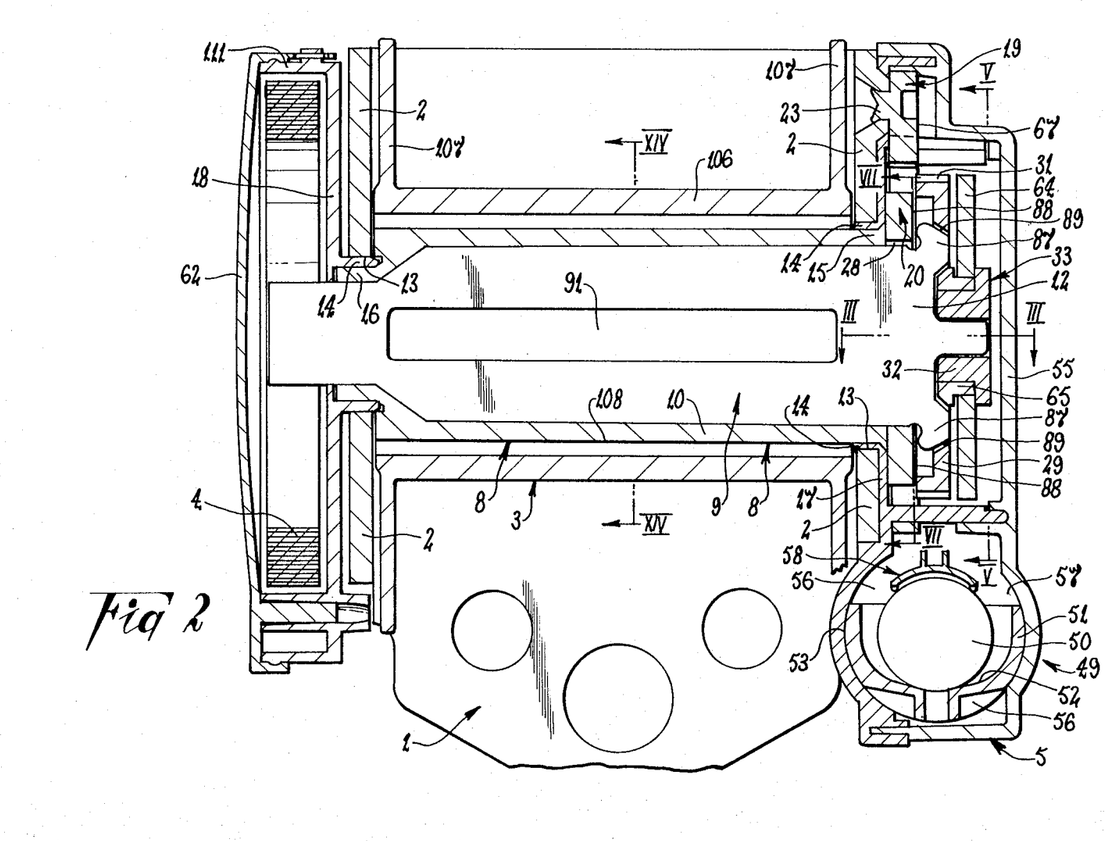
FIG. 2 is a cross sectional view taken along line II—II of FIG. 1.

A typical reel assembly to which the invention is applicable is shown in FIGS. 1 and 2, and includes a metal frame 1 which is securable to a vehicle in an appropriate position and has end walls 2 which provide a mounting for a rotatable spool 3. A section of webbing strap (not shown), which in use forms part of the safety belt, is wound upon the spool 3 and the spool 3 is urged in a belt winding direction by a suitable return spring 4. Reel locking mechanism is provided at one end of the assembly and a housing 5 moulded from plastics or other suitable material is arranged to enclose that mechanism. A further housing part 6 is arranged to enclose the return spring 4, which is at the end of the frame 1 opposite to that at which the aforementioned mechanism is located.

Figure 14:
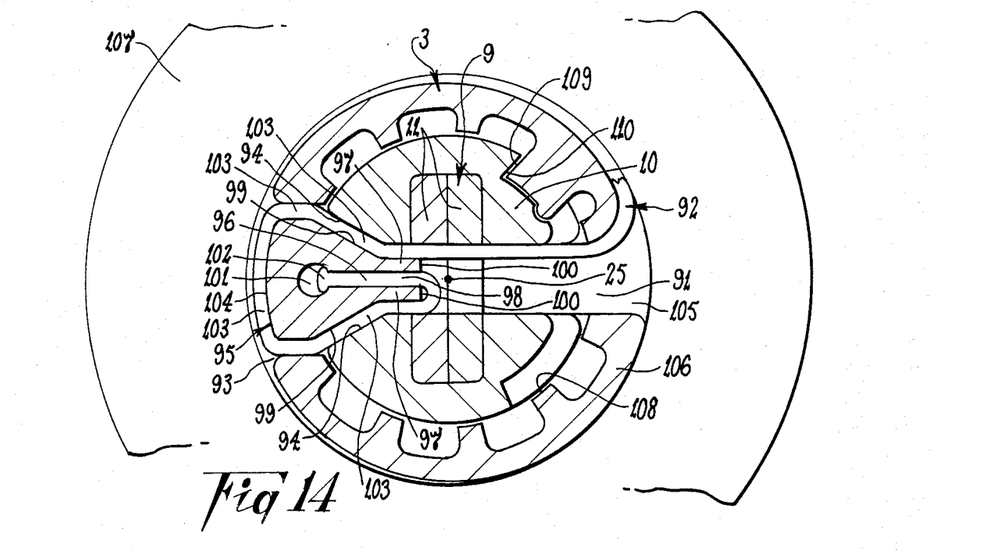
FIG. 14 is a cross sectional view taken along line XV—XV of FIG. 2.
Figure 15:
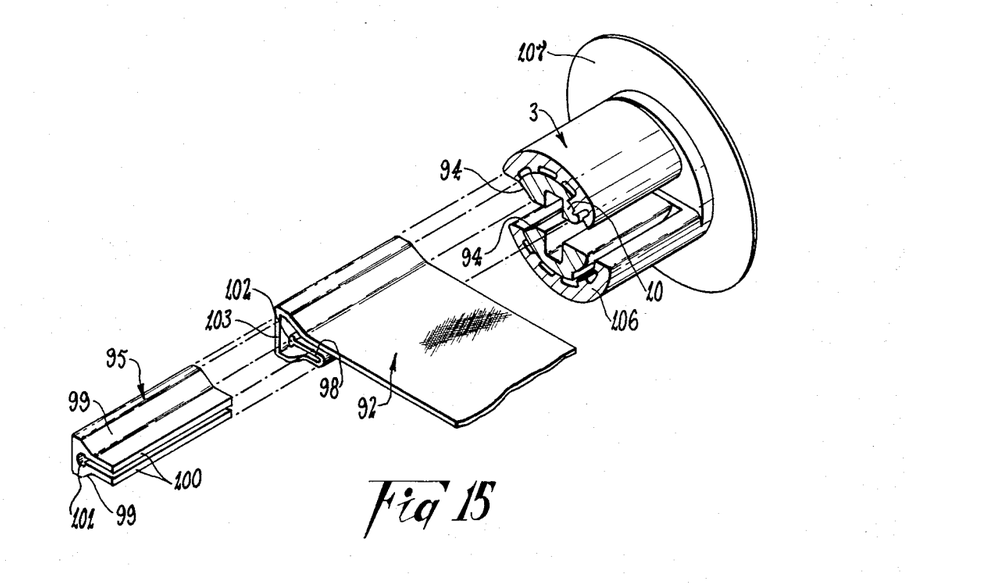
FIG. 15 is an exploded view of the components shown in FIG. 14, but showing the spool in transverse cross-section.

In the preferred construction shown, the spool 3 includes a spindle 8 which is a composite structure having a metal core 9 and a body 10 of plastics or other mouldable material (FIG. 14). In the example shown, the core 9 comprises two flat strips 11 secured in face to face engagement, whereas the spindle body 10 is a cylindrical section moulded about that core 9. An end portion 12 (FIG. 2) of the core 9 protrudes beyond one end of the spindle body 10 for a reason hereinafter made clear. It will be appreciated that the core 9 could be made from a single strip of metal rather than two strips as described and it could be a bar or rod rather than a strip.

Each end wall 2 of the frame 1 has an opening 13 through which the spindle 8 projects and provides the basis of a rotatable mounting for the spindle 8. Preferably, as shown, the rotatable mounting at each end wall 2 includes a bearing collar 14 of plastics material for example, disposed within the respective end wall opening 13 and which rotatably receives a respective cylindrical portion 15 and 16 of the spindle body 10. In the constructions shown, each such bearing collar forms an integral part of a respective end plate 17 and 18 of the assembly. Each end plate 17 and 18 may be moulded from plastics material and preferably lies in face to face engagement with the outside surface of the respective frame end wall 2 as shown.

Figure 7:
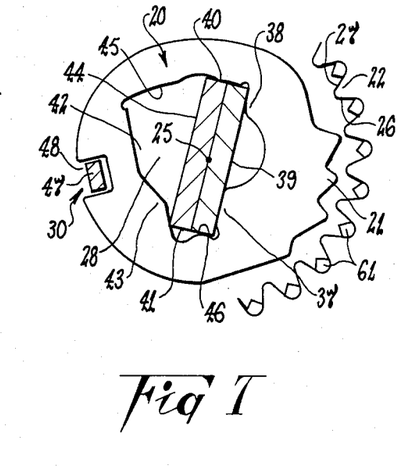
FIG. 7 is a cross sectional view taken along line VII—VII of FIG. 2 and showing the relative positions of various components of the mechanism when related components as shown in FIG. 5 have the relative positions shown in FIG. 5.

According to the arrangement shown, the reel locking mechanism is provided on the outside of one frame end wall 2 and the spindle return spring 4 is provided at the outside of the other end wall 2. The reel locking mechanism of that particular arrangement includes an internally toothed locking ring 19 which is secured to the frame 1 against relative movement, and a locking pawl 20 (FIG. 7) which is rotatable with the spindle 8 and is movable radially of the spindle 8 to adopt either an outer lock position (FIG. 11) or an inner release position (FIG. 7). In the outer position, a toothed part 21 of the locking pawl 20 engages with the locking ring teeth 22, and in the inner position that toothed part 21 is located clear of the locking ring teeth 22 so that the pawl 20 can rotate freely within the space surrounded by the locking ring 19. Spring means as hereinafter described normally urges the pawl 20 into the inner position.

It is generally convenient to form the locking ring 19 from a metal plate having a circular opening which is arranged coaxial with the spindle 8 when the ring 19 is secured in place. For example, the ring 19 may be secured by clinching as shown at 23 in FIG. 2 so that the ring 19 is secured direct to the adjacent end wall 2, although outside the actual points of connection the moulded end plate 17 intervenes between the ring 19 and the end wall 2. The teeth 22 are formed around the periphery of the ring opening and it is preferred that each tooth 22 is symmetrical about a plane which passes through the axis of the spindle 8. By way of illustration, such a plane is represented by the line 24 in FIG. 1 and point 25 represents the spindle axis.

The plane 24 therefore bisects its respective tooth 22, and if the ring 29 has an even number of teeth 22 the plane 24 will be common to two teeth 22 located on respective opposite sides of the spindle axis 25. Each tooth 22 then has two sloping side faces 26 and 27 which converge towards the axis 25 and slope at substantially the same angle relative to the respective plane 24. A ring 19 having such teeth 22 is therefore adapted for use in the reel assembly shown regardless of which direction of rotation of the spool 3 is the unwinding direction. In the FIG. 7 arrangement, the spool 3 unwinds in the anti-clockwise direction and the pawl teeth 21 react with side faces 26 of the teeth 22 to halt that rotation. If the unwinding direction was clockwise, the pawl 20 would be inverted and it would react with faces 27 of the teeth 22.

Adaptability of the locking ring 19 to either hand of operation presents a significant saving in the cost of manufacturing reel assemblies.

The pawl 20 is located within the opening of the ring 19 as best seen in FIG. 2. Thus, both the pawl 20 and the locking ring 19 are separated from the outside surface of the adjacent frame end wall 2 only by the intervening end plate 17 so that forces resulting from engagement of the pawl 20 and ring 19 are substantially reacted into the frame 1. The body part 10 of the spindle 8 preferably does not extend substantially beyond the outermost surface of the end plate 17, but as previously mentioned an end portion 12 of the core 9 projects beyond the body part 10 at that end of the spindle 8. The pawl 20 may be a plate-like member, formed of metal for example, having an opening 28 through which the core end portion 12 projects (FIG. 2). The opening 28 is shaped to allow limited relative rotation between the pawl 20 and spindle 8 as hereinafter described.

In the preferred construction shown, the pawl 20 is activated to adopt its outer lock position either by operation of an inertia device or by operation of a deceleration sensor device. In the construction shown, both devices influence the pawl 20 through the intermediary of a ratchet wheel 29 which is connected to the spindle 8 to rotate therewith and is also connected to the pawl 20 through a suitable coupling 30 (FIGS. 6 to 11) which functions as hereinafter described. The wheel 29 is mounted on the exposed end portion 12 of the spindle core 9 at a location directly adjacent to the pawl 20 as best seen in FIG. 2.

Figure 6:
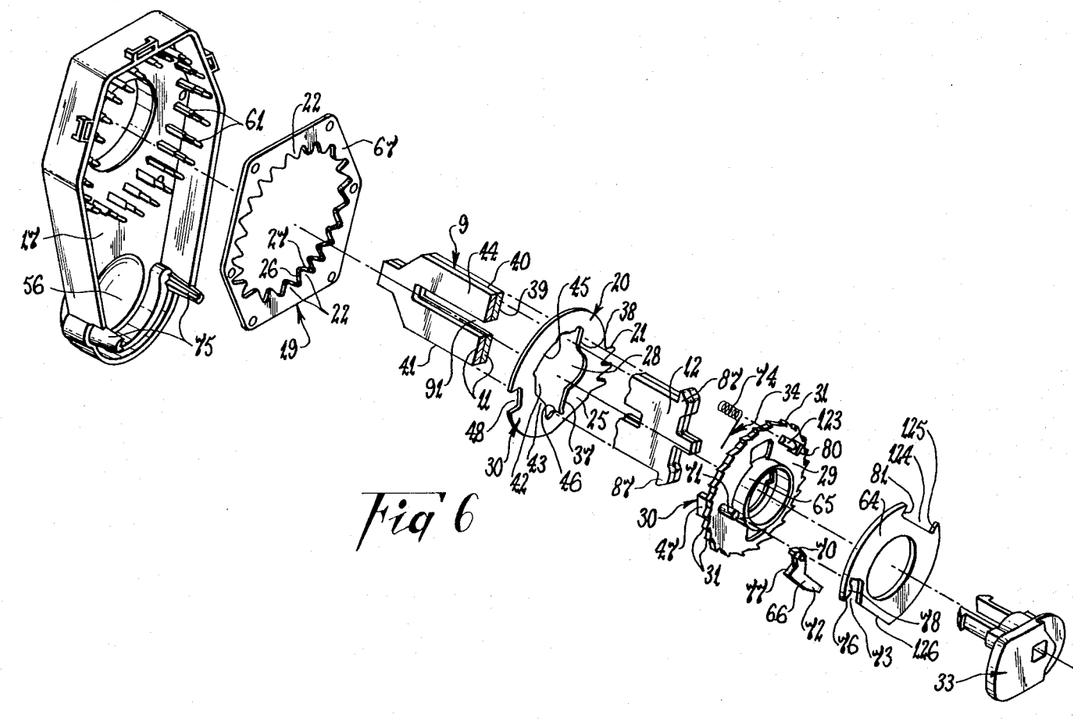
FIG. 6 is an exploded view of some of the components of the mechanism shown in FIGS. 1 and 2.

The ratchet wheel 29 may be generally in the form of a circular disc having a series of ratchet teeth 31 formed about its outer periphery (FIG. 6). The wheel 29 is drivably connected to the spindle 8 in any appropriate fashion, but that connection is preferably such that it includes a lost motion facility whereby the wheel 29 and spindle 8 are capable of limited relative rotation.

In the form of drive connection shown, the wheel 29 is rotatably mounted on a cylindrical portion 32 (FIG. 2) of an end cap 33 which is non-rotatably attached to the spindle core end portion 12 as hereinafter described. Rotation of the wheel 29 relative to the spindle 8 is limited by interaction between the wheel 29 and the pawl 20 and the aforementioned lost motion facility is provided by the connection between the pawl 20 and spindle 8. That is, the wheel 29 is coupled at 30 to the pawl 20 against relative rotation, but the pawl 20 is adapted for limited rotation relative to the spindle 8 and it is that adaptability which provides the lost motion facility for the ratchet wheel 29.

Figure 5:
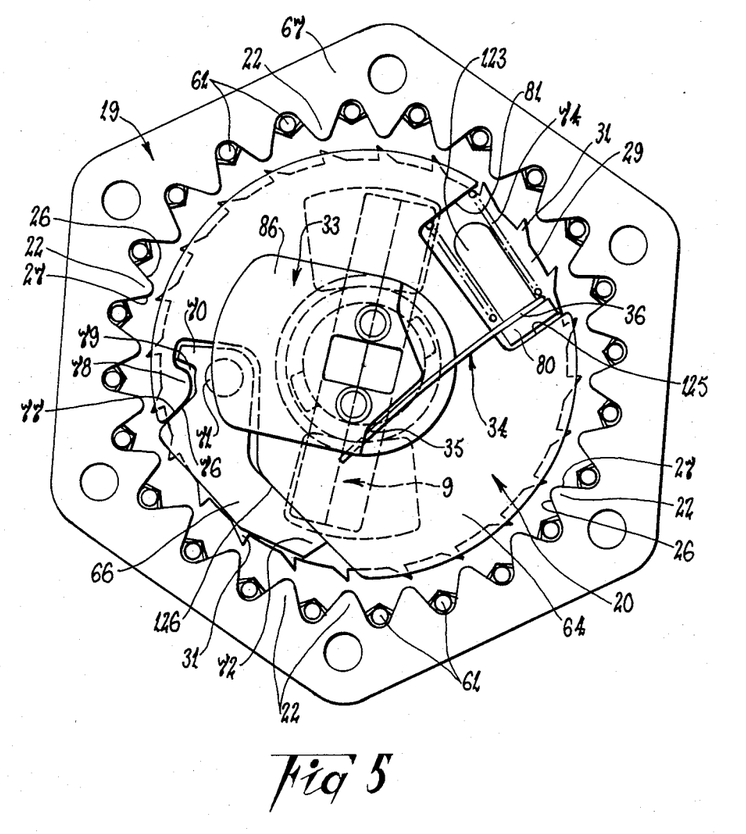
FIG. 5 is a cross sectional view taken along line V—V of FIG. 2.

The drive connection between the ratchet wheel 29 and spindle 8 also includes resilient means which urges the wheel 29 in one direction of rotation relative to the spindle 8, which is the unwinding direction of the spool 3. In the construction shown, that resilient means includes a spring arm 34 having an inner end portion 35 secured to the end cap 33 and its opposite outer end portion 36 acting against the ratchet wheel 29 at a location spaced radially outwards of the spindle axis 25 (FIG. 5). The flexibility of the spring arm 34 allows some degree of relative rotation between the spindle 8 and ratchet wheel 29 for a purpose hereinafter made clear, but under normal conditions the arm 34 transmits drive from the spindle 8 to the ratchet wheel 29 in both directions of rotation of the spindle 8.

Figure 9:
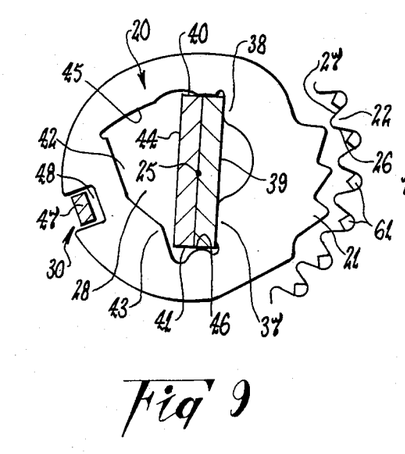
FIG. 9 is a view similar to FIG. 7 but showing the condition corresponding to that shown in FIG. 8.
Figure 11:
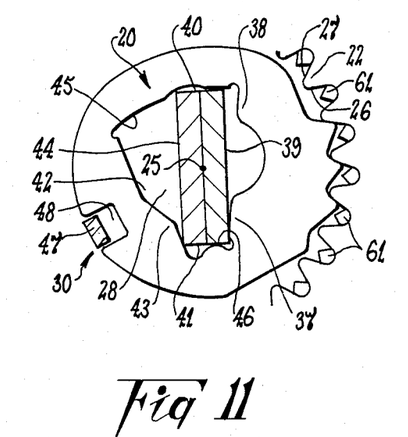
FIG. 11 is a view similar to FIG. 9 but showing the position adopted under the condition existing in FIG. 10.
Figure 12:
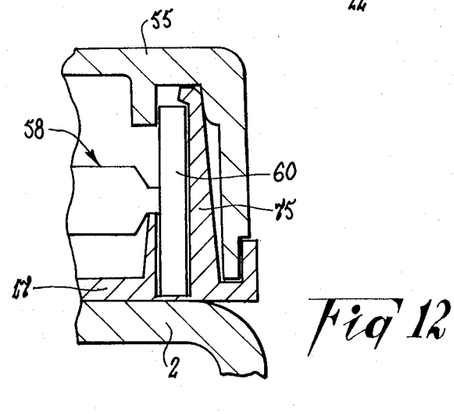
FIG. 12 is a cross sectional view taken along line XII—XII of FIG. 1.
Figure 13:
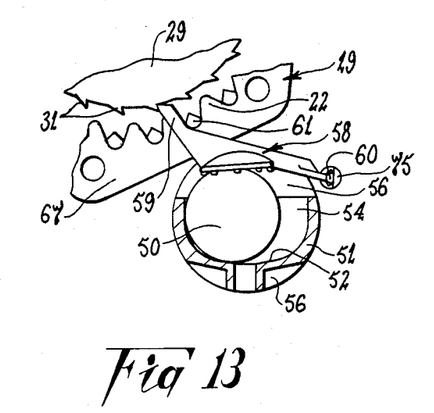
FIG. 13 is a view of the vehicle deceleration sensor shown in FIG. 1, but showing the sensor activated to initiate the reel locking action.

As best seen in FIGS. 7, 9 and 11, the part of the spindle end portion 12 which locates in the pawl opening 28 is generally rectangular in cross section, although other noncircular shapes may be adopted. The opening 28 is shaped relative to the shape of the end portion 12 so that the spindle 8 is able to rotate to a limited extent relative to the pawl 20. In the particular arrangement shown, the opening 28 has one edge (hereinafter called the back edge) which is shaped to provide two spaced humps 37 and 38, each of which is engagable with a broad surface 39 of the spindle core 9 adjacent respective longitudinal edges 40 and 41 of that core 9. The opposite or front edge of the opening 28 has a recess 42 extending over a substantial part of its length and the non-recessed part 43 is spaced from the adjacent broad surface 44 of the spindle core 9 when the back edge humps 37 and 38 engage that core 9. Another two opposed edges 45 and 46 of the opening 28 lie relatively close to respective longitudinal edges 40 and 41 of the spindle core 9 so that the spindle core 9 is substantially confined at those longitudinal edges.

The coupling 30 between the ratchet wheel 29 and the pawl 20 is located radially outwards of the spindle axis 25 and cooperates with the spindle core 9 in holding the pawl 20 against rotation about that axis relative to the ratchet wheel 29. The coupling 30 does however, allow some relative movement between those two components as hereinafter described. In the form shown, the coupling 30 comprises a pin 47 extending laterally from one side surface of the ratchet wheel 29 and which is slidably located within a radial slot 48 formed through the peripheral edge of the pawl 20. The arrangement is such that the pawl 20 is able to move radially relative to the ratchet wheel 29 over a limited distance (see FIGS. 7 and 11).

Figure 8:
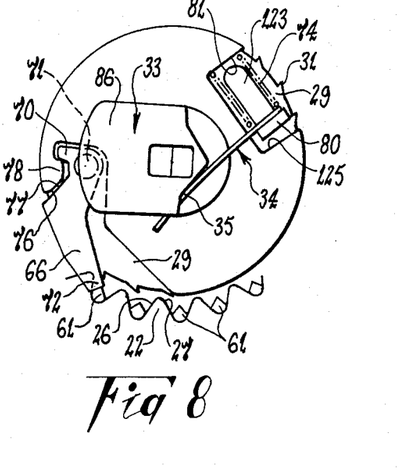
FIG. 8 is a view similar to FIG. 5 but showing the components arranged to initiate the reel locking action.
Figure 10:
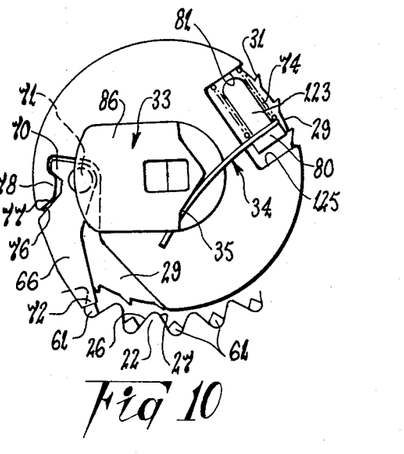
FIG. 10 is a view similar to FIG. 8 but showing the spindle of the reel advanced beyond the position shown in FIG. 8.

When the spool 3 is in a static condition, the pawl 20 is at its inner release position (FIG. 7) at which the back edge humps 37 and 38 engage against the adjacent broad surface 39 of the spindle core 9. If the spindle 8 is turned in the unwinding direction, rotation is transreact against the coil spring 74 causing momentary collapse of that spring 74 (FIG. 8). The ratchet wheel 29 over-travels as a result of that collapse and the detent 66 becomes operative in the manner previously described (FIG. 8). Thus, the ratchet wheel 29 is brought to a halt, but the spindle 8 continues to turn in the unwinding direction thereby causing operation of the pawl 20 as also previously described (FIG. 11). That over-travel of the spindle 8 stresses the spring arm 34 so the arm 34 applies a returning force to the ratchet wheel 29 (FIG. 10).

Thus, when the unwinding force is removed, the spindle 8 is urged in the rewinding direction by the return spring 4, but at the same time the spring arm 34 functions to return the ratchet wheel 29 to its original rest position relative to the spindle 8. As a result, the ratchet wheel 29 carries the pawl 20 with it so that both over-travel the spindle 8 in the rewinding direction and the pawl 8 is caused to adopt its inner release position as previously described. It therefore follows that the spring arm 34 indirectly provides a bias whereby the pawl 20 is urged into its inner release position.

A biasing spring 34 as described above therefore has the advantage of simplicity and the further advantage of maintaining a substantial constant bias on the pawl 20 regardless of the rotational position of that pawl 20. In that regard, the spring 34 does not act directly on the pawl 20, but acts on that pawl 20 through the intermediary of the ratchet wheel 29. Furthermore, the coaction between the pawl 20 and the ratchet wheel 29 at the coupling 30 is such that, under normal operating conditions, the pawl 20 does not impose a turning moment on the ratchet wheel 29 such as to act against the spring bias and consequently the magnitude of that bias is not affected by changes in the rotational position of the pawl 20.

A further significant feature of the construction particularly described is that there is a minimum of metal components and strength is imparted where necessary by rather simple means. Also, the use of a single moulding to provide the spindle bearing 14, locking ring locating bars 61 and sensor locating cavity 56 is advantageous. With that arrangement the bearing 14 and ring 19 are made coaxial so their critical relationship does not depend upon accurate manufacture of other components. As the same moulding provides at least part of the spherical seat for the sensor cup 51, it automatically establishes a correct relationship between the sensor device and other components of the mechanism. Still further, that single moulding assists in providing an effective environmetal seal for the assembly, and if desired may be attached to the adjacent frame end wall 2 by snap engagement.

Figure 3:
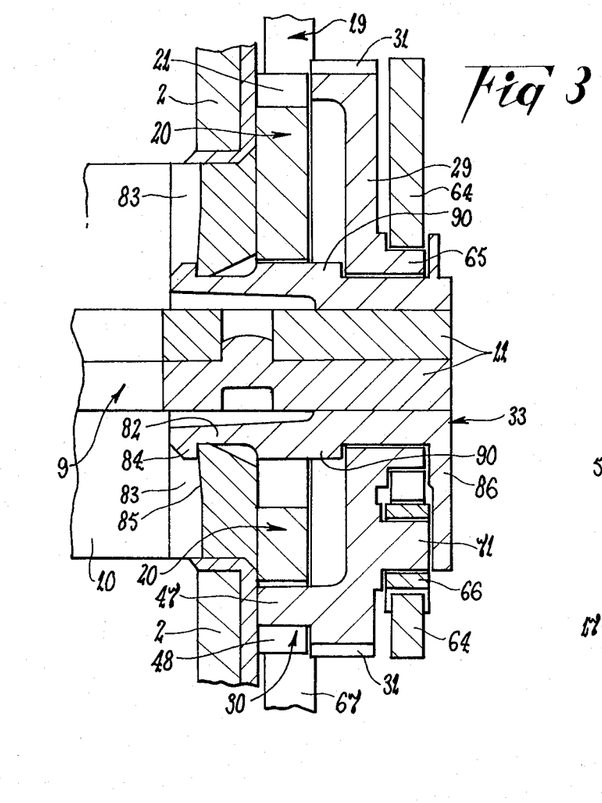
FIG. 3 is a cross sectional view taken along line III—III of FIG. 2.
Figure 4:
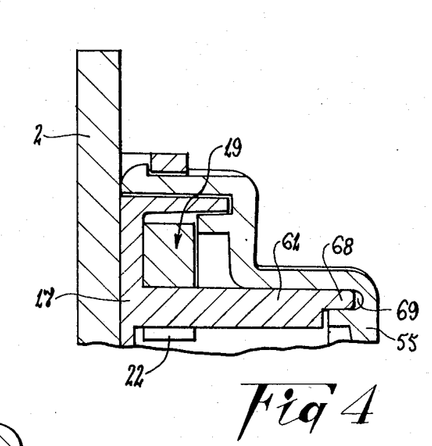
FIG. 4 is a cross sectional view taken along line IV—IV of FIG. 1.

As a further aid to simplifying manufacture, the end cap 33 which provides the rotational mounting for the ratchet wheel 29, may be connected to the assembly by snap engagement. Two laterally spaced legs 82 of the cap 33 may extend axially on respective opposite sides of the spindle core 9 as shown in FIG. 3, and extend into a cavity 83 at the adjacent end of the spindle body 10. A detent 84 on the terminal end of each leg 82 snap engages behind a surface 85 of the spindle body 10 which is provided within the cavity 83 and thereby retains the spindle 8 and end cap 33 in assembly. A flange 86 at the outer end of the cap 33 may overlie part of the inertia plate 64 to retain that plate 64 in assembly and thereby also retain the ratchet wheel 29 and pawl 20 in assembly. The flange 86 may be extended in one lateral direction as shown to overlie the pivoted end portion 70 of the detent 66 and consequently function to also retain the detent 66 on the pivot pin 71.

Assembly may be further simplified by providing laterally extending lugs 81 on the spindle core 9 to overlie the outer end face 88 of the pawl 20 and thereby retain the pawl 20 in correct axial position (FIG. 1). Windows 89 formed through the ratchet wheel 29 provide a clearance space for the lugs 87. Lugs 90 on the end cap 33 may locate behind the ratchet, wheel 29 to assist in fixing its axial position (FIG. 3).

The belt strap is preferably secured to the spindle 8 in the manner shown in FIG. 14 which does not require a loop to be formed on the strap end by stitching. In that preferred arrangement, an axially extending slot 91 is formed through opposite sides of the spool 3 to allow passage of the strap 92. The open mouth 93 of the slot 91 is enlarged at one side of the spool 3 as shown, and opposed surfaces 94 of that enlarged mouth 93 diverge outwardly, preferably from a location spaced from the spindle axis 25. The strap 92 is passed through the slot 91 from the side remote from the enlarged mouth 93 and a strap retainer 95 is attached to the terminal end portion 96 of the strap 92 and which cooperates with the diverging surfaces 94 to firmly retain the strap 92 against withdrawal from the spool 3.

In the particular construction shown, the retainer 95 is of bar-like form having two longitudinal jaw sections 97 arranged in face to face relationship and separated by a groove 98 extending the full length of the retainer 95. The jaw sections 97 are interconnected along adjacent rear longitudinal edges and are capable of movement towards and away from one another. The oppositely facing outer surfaces 99 of the jaw sections 97 diverge away from the front longitudinal edges 100 of the jaw sections 97 so that a front portion of the retainer 95 has a transverse cross sectional configuration which is substantially complementary to that of the enlarged slot mouth 93. The base of the groove 98 may be enlarged as shown at 101 in FIG. 14 to accept the terminal end 102 of the strap 92.

In use, the end portion 96 of the strap 92 is located between the jaw sections 97 and the immediately adjacent strap portion 103 is then turned back over the retainer 95 to overlie the outer surfaces 94 of both jaws 97 and the back edge 104 of the retainer 95. That is, the strap portion 103 effectively encapsulates the retainer 95. The strap 92 then extends beyond the front edges 100 of the retainer 95 into the slot 91 and emerges through the opposite mouth 105 of the slot 91. Retention of the strap 92 is effected by wedging the retainer 95 into the enlarged slot mouth 93 so that a section of the strap 92 is clamped between each pair of opposed sloping surfaces 94 and 99 and the jaws 97 are pressed firmly against the strap end portion 96.

A spool body, which forms a strap guide, is attached to the outside of the spindle 8 to retain the wound strap in a neat coil. That may comprise a sleeve 106 having a laterally extending flange 107 at each end and having a bore 108 which fits neatly over the outer surface of the spindle body 10. The slot 91 is formed through both the sleeve 106 and the spindle 8. Relative rotation of the sleeve 106 and spindle 8 may be prevented in any suitable manner, such as by interaction of opposed longitudinal faces 109 and 110 of the sleeve 106 and spindle 8 respectively.

A detent 66 is associated with the inertia plate 64 so as to be responsive to changes in the relative positions of the inertia plate 64 and ratchet wheel 29 to adopt either an operative position (FIG. 8) or an inoperative position (FIG. 5). In the operative position, the detent 66 engages one of the bars 61 and thereby halts rotation of the ratchet wheel 29 in the unwinding direction with consequent actuation of the pawl 20 as previously described. In the inoperative position, the detent 66 is held clear of the bars 61.

With regard to the foregoing, there is a plurality of bars 61 arranged in a circle concentric with the spindle axis 25. As best seen in FIG. 1, each bar 61 extends across the valley between a respective pair of locking ring teeth 22 and is wedged between opposed side surfaces of those teeth 22. Furthermore, each bar 61 projects beyond the outer side surface 67 of the locking ring 19 so as to be exposed for engagement by the detent 66, which is located outwardly beyond the surface 67 as shown in FIGS. 3 and 6. The bars 61 therefore provide a series of stationery teeth which are supported by the locking ring 19 and are engagable by the detent 66.

Preferably, the bars 61 are formed integral with the end plate 17 as shown in FIG. 6, and the outer terminal end 68 of each may engage within a respective hole 69 provided in the end cover 55 so as to provide resistance to lateral deflection of the bars 61. The bars 61 may function as locating means for the locking ring 19 and thereby provide a convenient means for achieving accurate assembly of the end plate 17 and ring 19. That is, the concentricity of the circle of bars 61 with the spindle 8 is fixed during moulding of the end plate 17 because the spindle bearing 14 is also an integral part of the plate 17. The bars 61 in turn fix the ring 19 in concentric relationship with the spindle 8.

According to the particular construction shown, the detent 66 is a lever having one end 70 pivotally mounted on the pin 71 projecting laterally from the side of the ratchet wheel 29 adjacent to the inertia plate 64. The pivot pin 71 is located relatively close to the periphery of the ratchet wheel 29 so that the detent 66 can swing outwardly to bring its terminal end 72 into engagement with one of the bars 61. Also in the construction shown, the detent 66 is located within a pocket 73 formed through the sides and periphery of the inertia plate 64 (FIG. 6) and which is so shaped as to influence pivotal movement of the detent 66 according to the relative rotational positions of the ratchet wheel 29 and inertia plate 64.

The ratchet wheel 29 is preferably arranged, as shown, to drive the inertia plate 64 in the unwinding direction through the interaction of a spring 74 which holds those two components in a normal relationship (FIG. 5), but allows relative over-travel of the ratchet wheel 29 in the unwinding direction under circumstances discussed below (FIG. 8). In the normal rotational relationship as shown in FIG. 5, an edge 76 of the inertia plate pocket 73 bears against an adjacent edge 77 of the detent 66 so as to urge that detent 66 about is pivot 71 into the inoperative position. Should the ratchet wheel 29 over-travel in the unwinding direction however, the detent 66 is carried with it so as to clear the pocket edge 76 and then coacts with part of the inertia plate 64 so as to be caused to pivot outwardly for engagement with the bars 61.

In the form shown, the aforementioned coaction occurs through a fulcrum lobe 78 projecting from a peripheral edge of the inertia plate pocket 73 and which locates within a substantially complementary recess 79 in the adjacent edge of the detent 66. That lobe 78 is located radially outwards of and adjacent to the pivot pin 71. Obviously, other arrangements could be adopted to achieve the same function.

The inertia plate 64 is preferably made of metal and is relatively heavy by comparison with the ratchet wheel 29. Thus, if the spindle 8 is moved suddenly in the unwinding direction, the greater inertia of the inertia plate 64 will cause it to lag behind the movement of the ratchet wheel 29. The interacting spring 74 is stressed to allow that to occur. As a result, the detent 66 is swung outwardly as described above to engage one of the bars 61 and thereby bring the ratchet wheel 29 to a halt. Thus, the pawl 20 is actuated as also described above, and the pawl 20 then functions to lock the spindle 8 against further unwinding rotation.

It is preferred that the spring 74 which acts between the ratchet wheel 29 and inertia plate 64 is a coil compression spring located adjacent the outer periphery of both the wheel 29 and plate 64. In the construction shown, the spring 74 is formed integral with the outer end 36 of the spring arm 34, but that is not essential, and has its axis extending generally in the circumferential direction of the ratchet wheel 29. The compression spring 74 is interposed between an abutment 80 of the ratchet wheel 29 and an opposed surface 81 of the inertia plate 64 so as to be subjected to compression in the event that the ratchet wheel 29 over-travels in the unwinding direction. As previously stated, the outer end portion 36 of the spring arm 34 is secured to the ratchet wheel 29 against relative movement so that rotation of the spindle 8 can be transferred directly to the ratchet wheel 29.

In the arrangement shown, the spring 74 is retained on a peg 123 which projects from the abutment 80 towards the inertia plate surface 81. The peg 123 and abutment 80 are located within a recess 124 formed in the periphery of the inertia plate 64 and the surface 81 forms one extremity of that recess 124. When the inertia plate 64 and the ratchet wheel 29 are in their normal relative positions as shown in FIG. 5, it is preferred that clearance exists between the abutment 80 and the other extreme end surface 125 of the recess 124 so that proper engagement is maintained between the surfaces 76 and 77 of the inertia plate 64 and detent 66 respectively. In that position, inward travel of the detent 66 about its pivot 71 is limited by engagement with a peripheral surface 126 of the inertia plate 64.

When the spindle 8 is turned without sudden movement in the unwinding direction, rotational movement of that spindle 8 is transferred to the ratchet wheel 29 through the spring arm 34. The wheel 29 in turn transfers the movement to the inertia plate 64 through the coil spring 74. Because of the relatively gentle nature of the turning force, the coil spring 74 will remain in its uncompressed state and consequently the interaction between the inertia plate 64 and detent 66 will retain that detent 66 in its inoperative position (FIG. 5). The pawl 20 is also influenced to turn in the required direction through its connection with the ratchet wheel 29 and because of that connection the biasing spring 34, 74 also influences the pawl 20 into its inner release position (FIG. 1).

If the spindle 8 is suddenly turned in the unwinding direction, the spring arm 34 will push the ratchet wheel 29 in the required direction, but because the inertia plate 64 has greater resistance to the turning force it will limited rotation relative thereto and has a plurality of teeth formed around the periphery thereof, said lever is engagable with a said ratchet wheel tooth when in the position corresponding to said active position and is thereby operable to prevent rotation of said ratchet wheel in one direction with said spindle, and said locking means operates in response to rotation of said spindle in said one direction relative to said ratchet wheel.

6. An emergency locking reel according to claim 1, wherein a detent is connected to said spindle for rotation therewith and is operable to cause operation of said locking means, an inertia plate separate from said locking means is mounted on said spindle for limited rotation relative thereto, said detent being responsive to a change in the relative positions of said detent and said inertia plate so as to be rendered operative by that change, and spring means acts on said inertia plate to resiliently resist said change in relative positions.

7. An emergency locking reel according to claim 6, wherein a locking bar extends across the valley between each pair of adjacent said locking ring teeth, each said bar extends substantially in the axial direction of said spindle and is located so that part of each adjacent said tooth projects radially beyond said bar, a portion of each said bar projects beyond an end face of said locking ring, and said detent engages with a said bar portion when operative to cause operation of said locking means.

8. An emergency locking reel according to claim 7, wherein each said bar is formed integral with an end plate of a housing which contains said locking means and which is secured to said frame.

9. An emergency locking reel according to claim 7, wherein a ratchet wheel is mounted on said spindle for limited rotation relative thereto and has a plurality of teeth formed around the periphery thereof, a vehicle deceleration responsive sensor is connected to said frame and includes a lever which is operable to engage a tooth of said ratchet wheel to thereby prevent rotation of said wheel in one direction with said spindle, said locking means operating in response to rotation of said spindle in said one direction relative to said ratchet wheel, and said lever extends between two adjacent said bars to be guided thereby into engagement with said ratchet wheel.

10. An emergency locking reel for a safety belt including, a frame, a spindle rotatably mounted on said frame, locking means operable to prevent rotation of said spindle relative to said frame in one direction, a housing secured to said frame and containing said locking means, a vehicle deceleration responsive sensor which is operable to cause operation of said locking means and has a part-spherical member, a spherical cavity within said housing which is substantially complementary to the spherical part of said member, said member being securable within said cavity in any one of a range of possible positions relative to said housing, and said position is selected according to the intended disposition of said housing relative to a vehicle to which it is attached in use.

11. An emergency locking reel according to claim 10, wherein in each said position of said member, the center about which the spherical part of said member is generated is contained in a plane which also contains the axis of said spindle.

12. An emergency locking reel according to claim 10, wherein said housing and said member are formed of a plastics material and said member is secured to said housing by induction welding.

13. An emergency locking reel according to claim 11, wherein said housing is substantially symmetrical about said plane.

14. An emergency locking reel according to claim 10, wherein said locking means includes a locking ring which is secured to said frame against relative movement and a pawl which is rotatable with said spindle and engages with said ring when said locking means is operative, the opening through said ring is coaxial with said spindle, and a plurality of teeth are provided around the periphery of said opening at regularly spaced intervals, each said tooth projecting inwardly towards the axis of said spindle and having a shape which is substantially symmetrical about a plane which contains the spindle axis.

15. An emergency locking reel according to claim 10, wherein a detent is connected to said spindle for rotation therewith and is operable to cause operation of said locking means, an inertia plate separate from said locking means is mounted on said spindle for limited rotation relative thereto, said detent being responsive to a change in the relative positions of said detent and said inertia plate so as to be rendered operative by that change, and spring means acts on said inertia plate to resiliently resist said change in relative positions.

16. An emergency locking reel for a safety belt including, a frame, a spindle rotatably mounted on said frame, a locking ring secured to said frame against movement relative thereto, a pawl rotatable with said spindle and being operable to engage said locking ring and thereby prevent rotation of said spindle in one direction relative to said frame, a vehicle deceleration responsive sensor operable to cause operation of said pawl, and an end plate attached to said frame and being moulded from a plastics material, said end plate having as integral parts thereof a bearing for said spindle, locating means to position said locking ring relative to said spindle, and further locating means to position said sensor relative to said spindle, wherein an opening through said locking ring is coaxial with said spindle, a plurality of teeth are provided around the periphery of said opening at regularly spaced intervals, and each of said teeth projects inwardly towards the axis of said spindle and has a shape which is substantially symmetrical about a plane which contains the spindle axis, wherein said locating means for the locking ring comprises a series of bars which project outwardly from said end plate in the axial direction of said spindle and each of which engages between a respective pair of adjacent teeth of said locking ring.

17. An emergency locking reel according to claim 16, wherein a detent is connected to said spindle for rotation therewith and is operable to cause operation of said pawl, an inertia plate is mounted on said spindle for limited rotation relative to both said spindle and said pawl, said detent being responsive to a change in the relative positons of said detent and said inertia plate so as to be rendered operative by that change, and spring means acts on said inertia plate to resiliently resist said change in relative positions.

18. An emergency locking reel for a safety belt including, a frame, a spindle rotatably mounted on said frame, a locking ring secured to said frame against movement relative thereto, a pawl rotatable with said spindle and being operable to engage said locking ring and thereby prevent rotation of said spindle in one di- Obviously, the sleeve 106 and spindle body 10 need not be formed separately, but could be formed by a single component.

The spool return spring 4 may be of the clockwork type and can be secured in any appropriate manner to react between a stationary part of the assembly and the rotatable spindle 8. Preferably, the inner end of the spring 4 locates within a slot (not shown) in an adjacent end portion of the spindle 8 and the outer end is secured to a surrounding substantially cylindrical wall 111 which is formed integral with the adjacent end plate 18 of the assembly. By way of example, the spring outer end may be located within a pocket (not shown) formed in the surrounding wall 111 and having a restricted opening through which the spring end cannot be easily withdrawn. That is, the spring end needs to be moved in the axial direction of the spindle 8 to enter and escape from that pocket.

Each end cover 55 and 62 may be formed of plastics material and may be secured in position on the assembly by snap engagement or other appropriate means similarly for the end plates 17 and 18.

Figure 16:
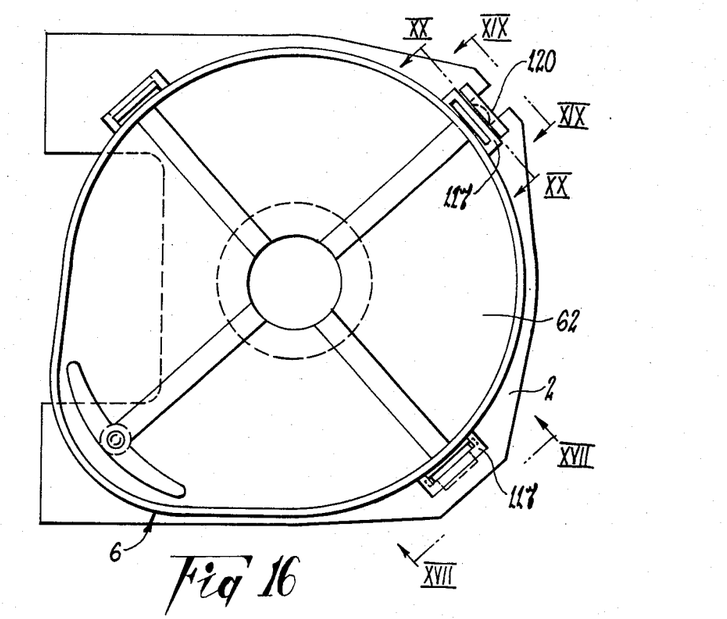
FIG. 16 is an end view of the reel assembly taken from the end opposite to that shown in FIG. 1.
Figure 17:
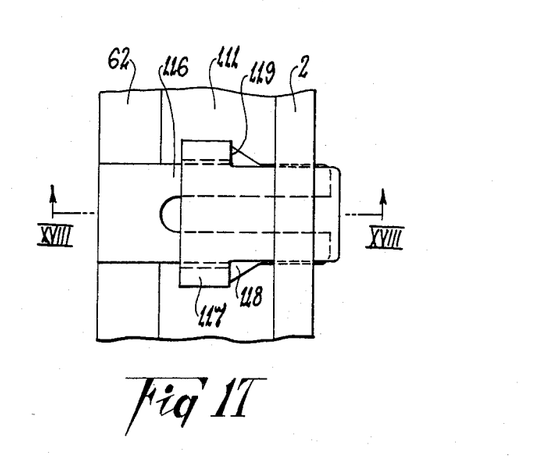
FIG. 17 is a view taken along line XVII—XVII of FIG. 16.
Figure 18:
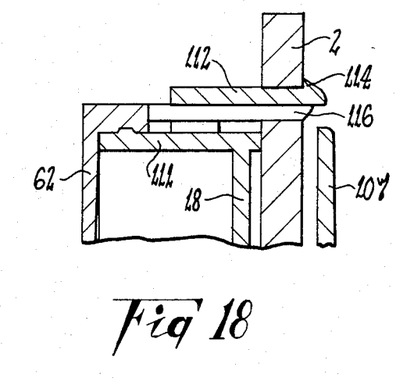
FIG. 18 is a cross sectional view taken along line XVIII—XVIII of FIG. 17.

In the example shown in FIGS. 16 to 21, the end plate 18 is retained against the adjacent frame end wall 2 through a plurality of fingers 112 formed integral with the end plate 18 and each of which passes through a respective opening 113 in the end wall 2 (FIG. 17 and 18). Those fingers 112 are located adjacent the outer periphery of the end plate 18 and are spaced around that periphery. Each finger 112 has a sharp lip 114 at its terminal end which snap engages with the inner surface 115 of the end wall 2 as shown in FIG. 18 to hold the plate 18 in position against that wall 2. Each wall opening 113 however, is of a size such that a clearance space exists at the side of the respective finger 112 which is remote from the lip 114. The end cover 62 is provided with a plurality of integral latching fingers 116, each of which is operable to enter a respective one of those clearance spaces and thereby retain the adjacent end plate finger 112 against separation from the frame end wall 2 as shown in FIG. 18.

Figure 20:
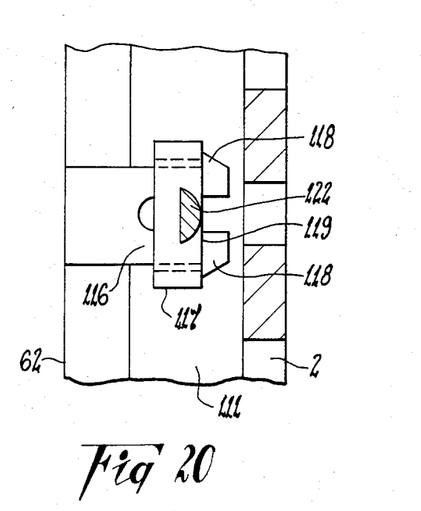
FIG. 20 is a cross sectional view taken along line XX—XX of FIG. 16.

The end cover 62 is preferably retained against separation from the end plate 18 by snap engagement between at least some of the latching fingers 116 and respective cooperable parts of the end plate 18. For example, as shown in FIGS. 17 and 20, each finger 116 extends through a flexible stirrup 117 formed integral with the end plate 18 and has a latching rib 118 which snap engages behind an end surface 119 of the stirrup 117. The stirrup 117 overlies the finger 116 and must be forced to flex outwards to allow subsequent withdrawal of the finger 116 and thereby permit separation of the cover 62 and end plate 18. Obviously, there are many other ways in which the desired retention may be achieved.

Figure 19:
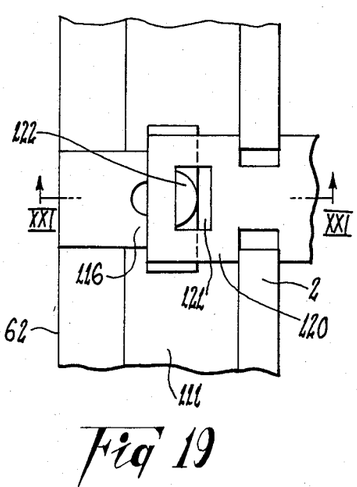
FIG. 19 is a view taken along line XIX—XIX of FIG. 16.
Figure 21:
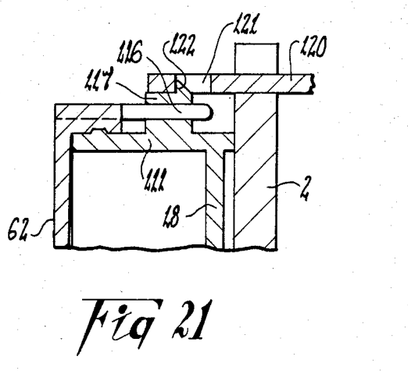
FIG. 21 is a cross sectional view taken along line XXI—XXI of FIG. 19.

As shown in FIGS. 16, 19 and 21, at least one metal reinforcing strap 120 may extend between and engage the two end covers 55 and 62 so as to strengthen the assembly. An opening 121 in one end of the strap 120 engages over a lug 122 formed integral with the end cover 62, and any appropriate connection may be provided between its opposite end and the end cover 55.

It will be clear from the preceding description that the retractor assembly has many valuable advantages both from the point of view of function and economy of manufacture. The assembly is particularly suited for production line assembly methods.

The ratchet wheel, inertia plate and biasing spring arrangement is particularly advantageous because of the relatively constant spring force acting between the ratchet wheel and inertia plate at all rotational positions of the spindle. In that arrangement the center of gravity of the inertia plate passes substantially through the spindle axis and the detent lever has little or no influence on the turning moment applied to the inertia plate.

It is also significant that the detent lever can be moulded from a plastics or other suitable material so as to enable easy and accurate formation. Accurate formation of the outer or tooth end of the detent lever permits accurate gating of that lever with the locking ring thereby minimizing or removing the risk of the pawl not engaging correctly with the locking ring. In that regard, the tooth end of the detent lever can be relatively sharp to provide accurate and positive engagement with the locking ring.

Various alterations, modifications and/or additions may be introduced into the constructions and arrangements of parts previously described without departing from the spirit or ambit of the invention as defined by the appended claims.

Having now described my invention, what I claim as new and desire to secure by Letters Patent is:

1. An emergency locking reel for a safety belt including a frame, a spindle rotatably mounted on said frame, a housing secured to said frame and being substantially symmetrical about a plane containing the axis of said spindle, locking means contained within said housing and being operable to prevent rotation of said spindle relative to said frame in one dircetion, a locking ring forming part of said locking means and being secured to said frame against relative movement, the opening through said ring being coaxial with said spindle, a plurality of teeth provided around the periphery of said opening at regularly spaced intervals, each said tooth projecting inwardly towards the axis of said spindle and having a shape which is substantially symmetrical about a plane which contains the spindle axis, a vehicle deceleration responsive sensor which is operable to cause operation of said locking means, and said housing includes a receptacle for part of said sensor and said receptacle being located outwardly of said opening and substantially symmetrical about said housing symmetry plane.

2. An emergency locking reel according to claim 1, wherein said sensor includes a ball contained within said sensor part and which is movable relative to that part from a rest position to an active position at which said sensor is operative to cause operation of said locking means, and said housing symmetry plane passes substantially through the center of said ball when that ball is in said rest position.

3. An emergency locking reel according to claim 2, wherein said sensor includes a lever pivotally mounted on said housing so as to be responsive to movement of said ball between said rest and active positions thereof, and said lever is operable when pivoted to a position corresponding to said active position to cause operation of said locking means.

4. An emergency locking reel according to claim 3, wherein said housing includes two mounting means for said lever, and a respective said mounting means is adopted according to the direction of rotation in which said reel unwinds.

5. An emergency locking reel according to claim 3, wherein a ratchet wheel is mounted on said spindle for limited rotation relative thereto and has a plurality of teeth formed around the periphery thereof, said lever is engagable with a said ratchet wheel tooth when in the position corresponding to said active position and is thereby operable to prevent rotation of said ratchet wheel in one direction with said spindle, and said locking means operates in response to rotation of said spindle in said one direction relative to said ratchet wheel.

6. An emergency locking reel according to claim 1, wherein a detent is connected to said spindle for rotation therewith and is operable to cause operation of said locking means, an inertia plate separate from said locking means is mounted on said spindle for limited rotation relative thereto, said detent being responsive to a change in the relative positions of said detent and said inertia plate so as to be rendered operative by that change, and spring means acts on said inertia plate to resiliently resist said change in relative positions.

7. An emergency locking reel according to claim 6, wherein a locking bar extends across the valley between each pair of adjacent said locking ring teeth, each said bar extends substantially in the axial direction of said spindle and is located so that part of each adjacent said tooth projects radially beyond said bar, a portion of each said bar projects beyond an end face of said locking ring, and said detent engages with a said bar portion when operative to cause operation of said locking means.

8. An emergency locking reel according to claim 7, wherein each said bar is formed integral with an end plate of a housing which contains said locking means and which is secured to said frame.

9. An emergency locking reel according to claim 7, wherein a ratchet wheel is mounted on said spindle for limited rotation relative thereto and has a plurality of teeth formed around the periphery thereof, a vehicle deceleration responsive sensor is connected to said frame and includes a lever which is operable to engage a tooth of said ratchet wheel to thereby prevent rotation of said wheel in one direction with said spindle, said locking means operating in response to rotation of said spindle in said one direction relative to said ratchet wheel, and said lever extends between two adjacent said bars to be guided thereby into engagement with said ratchet wheel.

10. An emergency locking reel for a safety belt including, a frame, a spindle rotatably mounted on said frame, locking means operable to prevent rotation of said spindle relative to said frame in one direction, a housing secured to said frame and containing said locking means, a vehicle deceleration responsive sensor which is operable to cause operation of said locking means and has a part-spherical member, a spherical cavity within said housing which is substantially complementary to the spherical part of said member, said member being securable within said cavity in any one of a range of possible positions relative to said housing, and said position is selected according to the intended disposition of said housing relative to a vehicle to which it is attached in use.

11. An emergency locking reel according to claim 10, wherein in each said position of said member, the center about which the spherical part of said member is generated is contained in a plane which also contains the axis of said spindle.

12. An emergency locking reel according to claim 10, wherein said housing and said member are formed of a plastics material and said member is secured to said housing by induction welding.

13. An emergency locking reel according to claim 11, wherein said housing is substantially symmetrical about said plane.

14. An emergency locking reel according to claim 10, wherein said locking means includes a locking ring which is secured to said frame against relative movement and a pawl which is rotatable with said spindle and engages with said ring when said locking means is operative, the opening through said ring is coaxial with said spindle, and a plurality of teeth are provided around the periphery of said opening at regularly spaced intervals, each said tooth projecting inwardly towards the axis of said spindle and having a shape which is substantially symmetrical about a plane which contains the spindle axis.

15. An emergency locking reel according to claim 10, wherein a detent is connected to said spindle for rotation therewith and is operable to cause operation of said locking means, an inertia plate separate from said locking means is mounted on said spindle for limited rotation relative thereto, said detent being responsive to a change in the relative positions of said detent and said inertia plate so as to be rendered operative by that change, and spring means acts on said inertia plate to resiliently resist said change in relative positions.

16. An emergency locking reel for a safety belt including, a frame, a spindle rotatably mounted on said frame, a locking ring secured to said frame against movement relative thereto, a pawl rotatable with said spindle and being operable to engage said locking ring and thereby prevent rotation of said spindle in one direction relative to said frame, a vehicle deceleration responsive sensor operable to cause operation of said pawl, and an end plate attached to said frame and being moulded from a plastics material, said end plate having as integral parts thereof a bearing for said spindle, locating means to position said locking ring relative to said spindle, and further locating means to position said sensor relative to said spindle, wherein an opening through said locking ring is coaxial with said spindle, a plurality of teeth are provided around the periphery of said opening at regularly spaced intervals, and each of said teeth projects inwardly towards the axis of said spindle and has a shape which is substantially symmetrical about a plane which contains the spindle axis, wherein said locating means for the locking ring comprises a series of bars which project outwardly from said end plate in the axial direction of said spindle and each of which engages between a respective pair of adjacent teeth of said locking ring.

17. An emergency locking reel according to claim 16, wherein a detent is connected to said spindle for rotation therewith and is operable to cause operation of said pawl, an inertia plate is mounted on said spindle for limited rotation relative to both said spindle and said pawl, said detent being responsive to a change in the relative positons of said detent and said inertia plate so as to be rendered operative by that change, and spring means acts on said inertia plate to resiliently resist said change in relative positions.

18. An emergency locking reel for a safety belt including, a frame, a spindle rotatably mounted on said frame, a locking ring secured to said frame against movement relative thereto, a pawl rotatable with said spindle and being operable to engage said locking ring and thereby prevent rotation of said spindle in one direction relative to said frame, a vehicle deceleration responsive sensor operable to cause operation of said pawl, and an end plate attached to said frame and being moulded from a plastics material, said end plate having as integral parts thereof a bearing for said spindle, locating means to position said locking ring relative to said spindle, and further locating means to position said sensor relative to said spindle, wherein said further locating means includes a spherical recess in said end plate, said sensor includes a part-spherical member, the spherical part of which is substantidlly complementary to said recess, and said member is securable within said recess in any one of a range of positions relative to said frame, and said position is selected according to the intended disposition of said frame relative to a vehicle to which it is attached in use.

19. An emergency locking reel according to claim 18, wherein a plane containing said spindle axis passes substantially through the center of said spherical part in all said positions of said member, said sensor includes a pivotal lever which is operable to cause operation of said pawl, and said further locating means includes two pivotal mountings for said lever pivot, a respective one of which is adopted according to the direction of rotation in which said reel unwinds.

* * * * *